(12) United States Patent
Vinchon

(10) Patent No.: US 8,207,965 B2
(45) Date of Patent: Jun. 26, 2012

(54) REWRITABLE COMPRESSION OF TRIANGULATED DATA

(75) Inventor: Eric Vinchon, Lyons (FR)

(73) Assignee: Adobe Systems Incorporated, San Jose, CA (US)

( * ) Notice: Subject to any disclaimer, the term of this patent is extended or adjusted under 35 U.S.C. 154(b) by 1084 days.

(21) Appl. No.: 11/689,210

(22) Filed: Mar. 21, 2007

(65) Prior Publication Data

US 2008/0012854 A1      Jan. 17, 2008

Related U.S. Application Data

(60) Provisional application No. 60/830,142, filed on Jul. 11, 2006.

(51) Int. Cl.
*G06T 17/00* (2006.01)

(52) U.S. Cl. ........ 345/420; 345/428; 345/442; 345/441; 345/419; 345/423; 382/232; 382/241; 382/243

(58) Field of Classification Search .......... 345/418–573; 382/232–275
See application file for complete search history.

(56) References Cited

U.S. PATENT DOCUMENTS

| | | | |
|---|---|---|---|
| 5,561,749 A | | 10/1996 | Schroeder |
| 6,208,347 B1* | | 3/2001 | Migdal et al. ............ 345/419 |
| 6,307,551 B1* | | 10/2001 | Gueziec et al. ........... 345/419 |
| 6,496,185 B1* | | 12/2002 | Keam ..................... 345/419 |
| 6,611,267 B2* | | 8/2003 | Migdal et al. ............. 345/428 |
| 6,816,820 B1* | | 11/2004 | Friedl et al. .................. 703/2 |
| 6,819,966 B1* | | 11/2004 | Haeberli ..................... 700/98 |
| 6,853,373 B2* | | 2/2005 | Williams et al. .......... 345/419 |
| 2002/0050992 A1* | | 5/2002 | Deering ..................... 345/423 |

OTHER PUBLICATIONS

Bajab, C. L., et al., "Single-Resolution Compression of Arbitrary Triangular Meshes with Properties," Data Compression Conference, Mar. 29, 1999, pp. 247-256, XP010329127.

Nachiappan, S, et al., "Geometry Based Connectivity Compression of Triangular Meshes," Indian Conference on Computer Vision, Graphics and Image Processing, 2002, pp. 1-6, XP002488273.

(Continued)

*Primary Examiner* — Jeffery A Brier
*Assistant Examiner* — Abderrahim Merouan
(74) *Attorney, Agent, or Firm* — Robert C. Kowert; Meyertons, Hood, Kivlin & Goetzel, P.C.

(57) ABSTRACT

A digital representation having a data structure with tessellated data defining an object in terms of triangles is compressed by analyzing the tessellated data to identify neighboring triangles, identifying stripes comprising series of neighboring triangles, redefining a given triangle with respect to a preceding triangle in the stripe in terms of a vertex of the given triangle that is not on a common edge with the preceding triangle. Digital values of the compressed digital representation for a triangle are fed back to the digital representation and are used for triangles processed subsequently. The third vertex can be defined in terms of a vector from a predetermined position with respect to the common edge.

15 Claims, 14 Drawing Sheets

OTHER PUBLICATIONS

Attene, M., et al., "SwingWrapper: Retiling Triangle Meshes for Better EdgeBreaker Compression," ACM Transactions on Graphics ACM USA, vol. 22, No. 4, Oct. 2003, p. 990, XP002488274.

Deering, Michael, "Geometry Compression," Computer Graphics Proceedings, IEEE, Aug. 6, 1995, pp. 13-20, XP000546211.

Chou, P. H., et al., "Vertex Data Compression Through Vector Quantization," IEEE Transactions on Visualization and Computer Graphics, IEEE Service Center, vol. 8, No. 4, Oct. 1, 2002, pp. 373-382, XP011095052.

Vanecek, et al., "Comparison of Triangle Strips Algorithms," Computers and Graphics, Elsevier, GB, vol. 31, No. 1, Feb. 15, 2007, pp. 100-118, XP005891220.

Shikare, D., "State of the Art in Geometry Compression," National Centre for Software Technology, India, 2000, pp. 1-8, XP002488275.

International Search Report from PCT/US2007/071916, mailed Aug. 18, 2008.

* cited by examiner

SOLID
┕▶ < FACE >
┕▶ < FACE >

FACE
┕▶ < TRIANGLE >
   < TRIANGLE >

TRIANGLE
┕▶ < VERTEX 1 >
   < VERTEX 2 >
   < VERTEX 3 >
   < SURFACE NORMAL 1 >
   < SURFACE NORMAL 2 >
   < SURFACE NORMAL 3 >

VERTEX
┕▶ < X >
┕▶ < Y >
   < Z >

Fig. 4

REWRITABLE COMPRESSION OF TRIANGULATED DATA

This application claims priority to U.S. Provisional Application No. 60/830,142, filed Jul. 11, 2006.

BACKGROUND

The invention relates to the compression of triangulated data structures.

Objects can be defined in terms of faces formed of tessellated triangles. The triangles are typically defined in terms of the positions of the vertices, one or more normals at the vertices, the vectors connecting the vertices and the normals to the faces formed by the triangles.

Such tessellated data structures can be used to define complex objects that comprise very many such triangles. Especially for a large object, a large volume of data is typically required to define the object.

There is a need, therefore, to provide for the compression of such data. In order to enable a significant compression of data, it is to be expected that some loss of information may occur. However, it would be desirable that the compression is achieved in a re-writable manner so that the data structure can be stored and retrieved multiple times without further degradation of the information.

An embodiment of the present invention seeks to provide for rewritable compression of triangulated data structures.

SUMMARY OF THE INVENTION

Aspects of the present invention are defined in the appended claims.

An embodiment of the invention can provide a computer-implemented method of compressing a digital representation of an object. The digital representation can include tessellated data defining the object in terms of triangles representing faces on a surface of the object and digital values representing the coordinates of the vertices of the triangles and vectors representing normals to the surface. The method can include analyzing the tessellated data to identify neighboring triangles that is triangles that have a common edge. Stripes can be identified that include series of neighboring triangles with a given triangle in a stripe defined with respect to a preceding triangle in the stripe in terms of a third vertex of the given triangle, first and second vertices of the given triangle being the vertices at respective ends of the common edge for the given triangle and the preceding triangle. Digital values of the compressed digital representation for a triangle are fed back to the digital representation and are used for triangles processed subsequently.

For each given triangle in the stripe, the third vertex can be redefined in terms of a vector from a predetermined position with respect to the common edge.

An embodiment of the invention can also provide a system and/or a computer program product that implements the aforementioned method.

An aspect of the invention can also provide a compressed data structure forming a product of the aforementioned method for modeling a solid forming at least a part of an object. The compressed data structure uses tessellated triangles and can comprise:

one or more face fields, each face field representing a face of the solid and referencing one or more triangle fields;

one or more triangle fields, each representing a triangle forming at least part of a face and referencing three vertex fields; and a plurality of vertex fields, each representing a vertex of a triangle and referencing three coordinate field, at least one coordinate of a vertex being defined in terms of a difference value with respect to at least one other vertex.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Specific embodiments of the present invention will now be described by way of example only with reference to the accompanying Figures in which:

FIG. 4 is a schematic representation of part of a data structure for representing a solid that forms the whole or part of an object;

Figure 1:
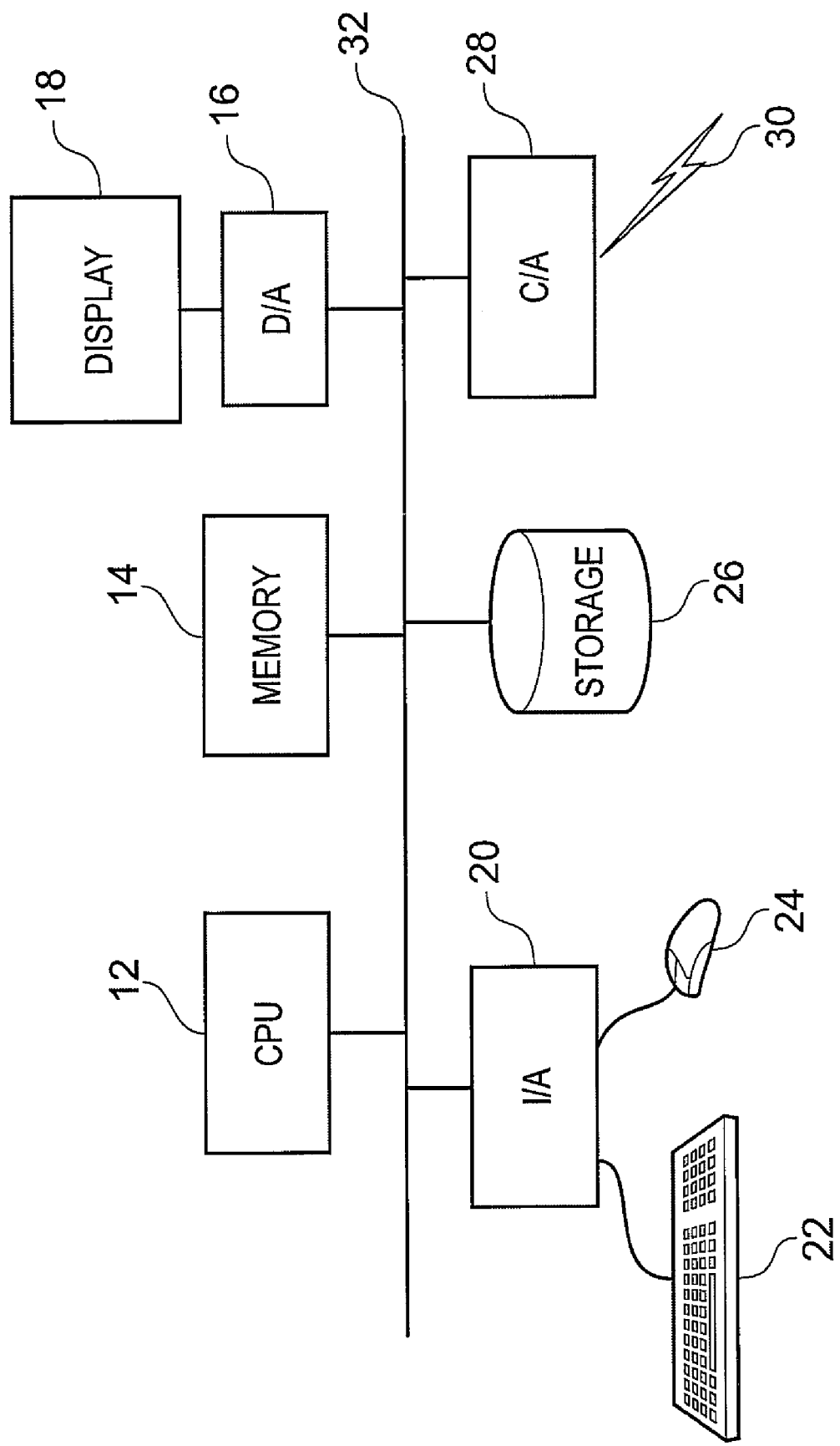
FIG. 1 is a schematic block diagram of an example of a computer system implementing an example embodiment of the present invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

An example embodiment of the invention will be described in the following.

FIG. 1 is a schematic diagram illustrating an example of a computer system 10 for implementing an example embodiment of the present invention. Various components are interconnected by a bus system 32. One or more processors 12 can be provided. Random access memory 14 can also be provided as a working memory. A display adaptor 16 can enable the connection of a display 18. An input/output adaptor 20 can enable the connection of one or more user input devices, for example a keyboard 22 and a mouse 24. Storage 26 can provide for persistent storage of data. In the present example, a data structure that includes a hierarchy of data elements can be stored in the storage 26. A communications adaptor 28 can provide connection to a network via a link 30. It will be appreciated that FIG. 1 is a schematic representation, only, of a computer system, and that the computer system can take many different forms.

Figure 2:
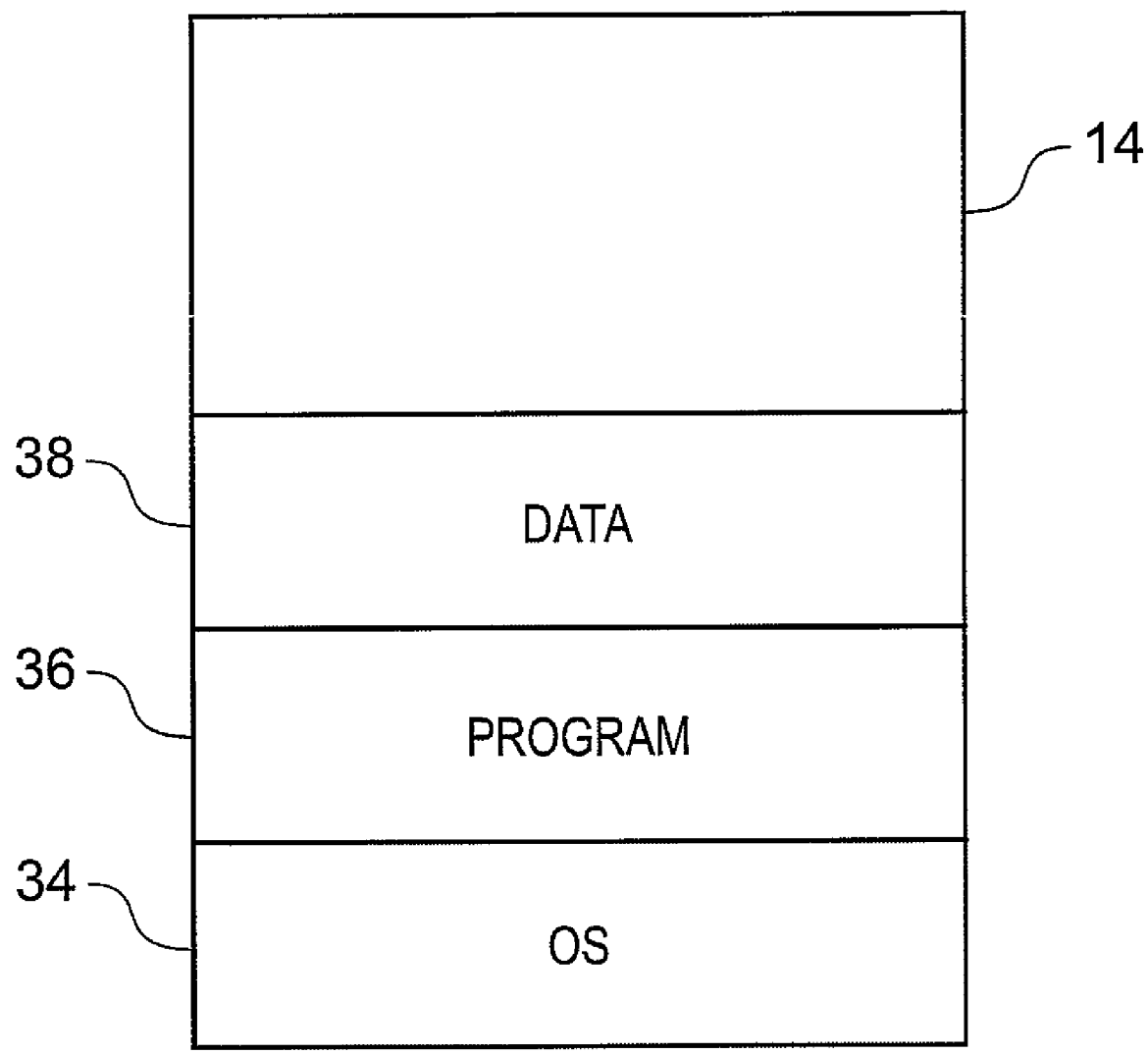
FIG. 2 is a schematic diagram of information held in a memory during operation of the computer system.

FIG. 2 provides a schematic overview of information held in a memory 14 during operation of the computer system. The data in the memory 14 can be loaded, for example, from read-only memory (not shown) and/or from the storage 26. The information in the memory 14 can include components of an operating system 34, components of a program 36 operating on the operating system, and data 38 for use by the operating system 34 and the program 36. In the operation of an example embodiment of the invention, data elements of the data structure referred to with reference to FIG. 1 can be loaded from the storage 26 into the memory 14.

Figure 3:
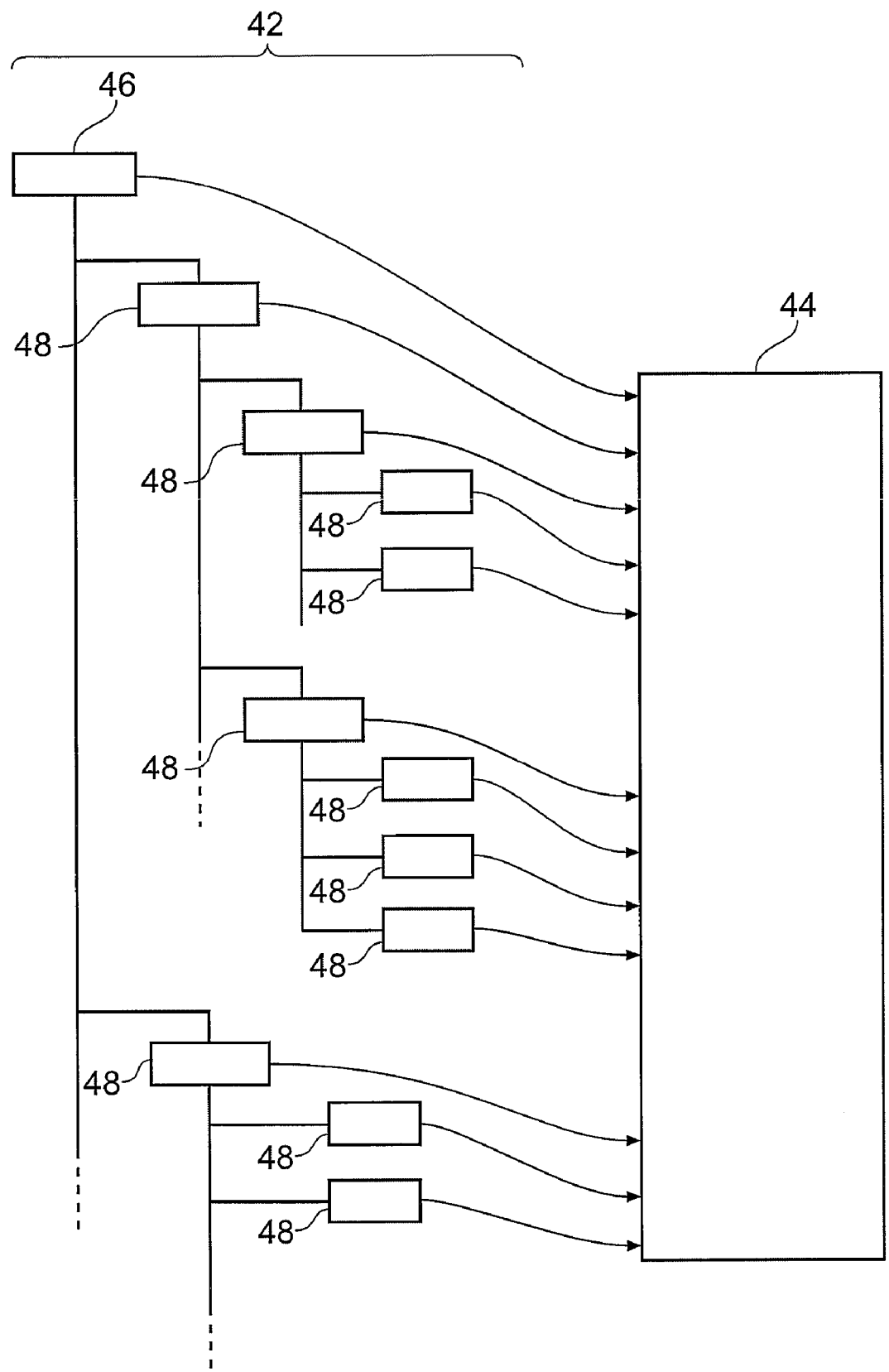
FIG. 3 is a schematic representation of an example of a data structure representing an object.

FIG. 3 is a schematic representation of a data structure 42 for representing a complex object. As illustrated in FIG. 3, a hierarchical structure 42 can represent one or more objects. The object(s) can be a physical device, component, assembly, or the like. Within the hierarchical structure 42, a plurality of data elements 46 and 48 are shown. Data element 46 is a root element forming a root node for representing a complete object. The data elements 48 can represent sub-assemblies, components, parts, etc (hereinafter parts) of the object. It is to be understood in this document that references to a "part" in the context of one or more data elements does not mean that an entity concerned is single unitary part, but rather that can be any one of a sub-assembly, a component, etc. The data elements 48 are linked either directly or indirectly to the root node. Through the use of the hierarchical structure 42 illustrated in FIG. 3, various levels of parts can be linked together. For example, elements can be related to components, components can be related to sub-assemblies and the sub-assemblies can be related to other sub-assemblies and/or to the whole object in a manner that permits individual manipulation of the elements, components, sub-assemblies and indeed the whole object.

In an example embodiment of the invention described herein, the hierarchical structure 42 is generated with respect to base data 44. The base data 44 can be a binary file representative of the object which has been generated, for example, by a computer aided design (CAD) package independently of example embodiment described herein. The example embodiment is able to analyze the base data 44 and to generate, from that base data 44, the hierarchical structure 42.

FIG. 4 is a schematic representation of a graphical data structure for representing a solid that forms the whole or part of an object.

The solid can be made up of one or more faces.

Each face can be made up of one or more triangles.

Each triangle can be defined in terms of first second and third vertices with a normal at each vertex. A normal to the surface of the triangle can be formed, for example, by a cross-product on its vertices oriented in conjunction with one of the three normals for the vertices.

Each vertex can be defined spatial coordinates, for example Cartesian (X, Y, Z) coordinates.

Figure 5:
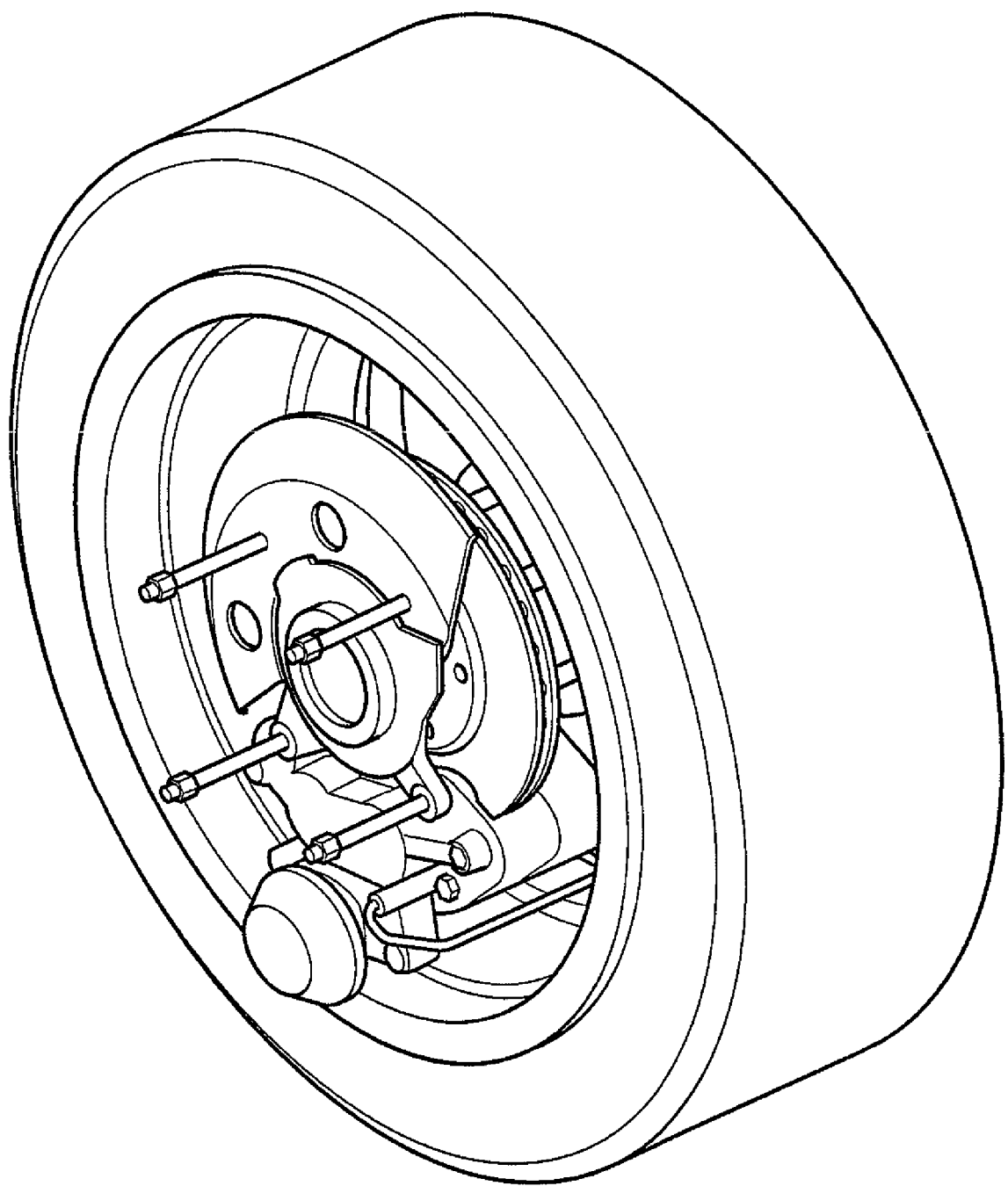
FIG. 5 is a visual representation of example of an object modeled by a data structure as represented in FIGS. 3 and/or 4.

An object represented by such a data structure can be a complex object, for example a building, a machine, a vehicle, etc., for example a wheel assembly as illustrated in FIG. 5.

An embodiment of the present invention can model an object, for example as illustrated in FIG. 5, through the use of tessellated triangles. The triangles tessellate together to form an approximation of the surface of the object. As indicated in FIG. 4, the triangles can be defined in terms of the vertices of the triangles, the edges between those vertices, and normals at the vertices (and optionally at the center of the triangle). The normals are operative to identify the normals to the actual surface of the object at the vertices of the triangle (and optionally at the center of the triangle).

Figure 6:
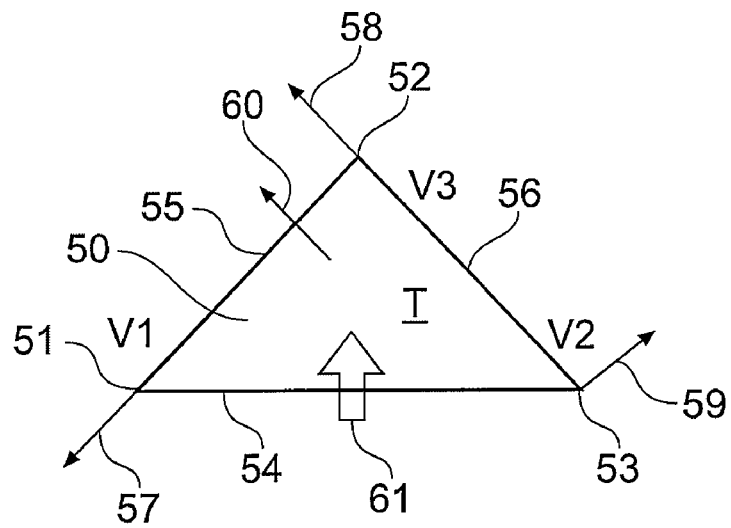
FIG. 6 is a schematic representation of a triangle used in a tessellated representation of an object.

FIG. 6 is a schematic representation of such a triangle (T) 50. The triangle 50 has three vertices (V1, V2 and V3) 51, 52 and 53. A first edge 54 is formed between the vertices 51 and 53. A second edge 55 is formed between the vertices 51 and 52. A third edge 56 is formed between the vertices 52 and 53. A normal 57 defines the normal to the surface of the object at the vertex 51. A normal 58 defines the normal to the surface of the object at the vertex 52. A normal 59 defines the normal to the surface of the object at the vertex 53. Optionally, a normal 60 defines the normal to the surface of the object at the center of the triangle 50. The normal 60 can be formed, for example, by a cross-product on its vertices oriented in conjunction with one of the three normals for the vertices.

Figure 7:
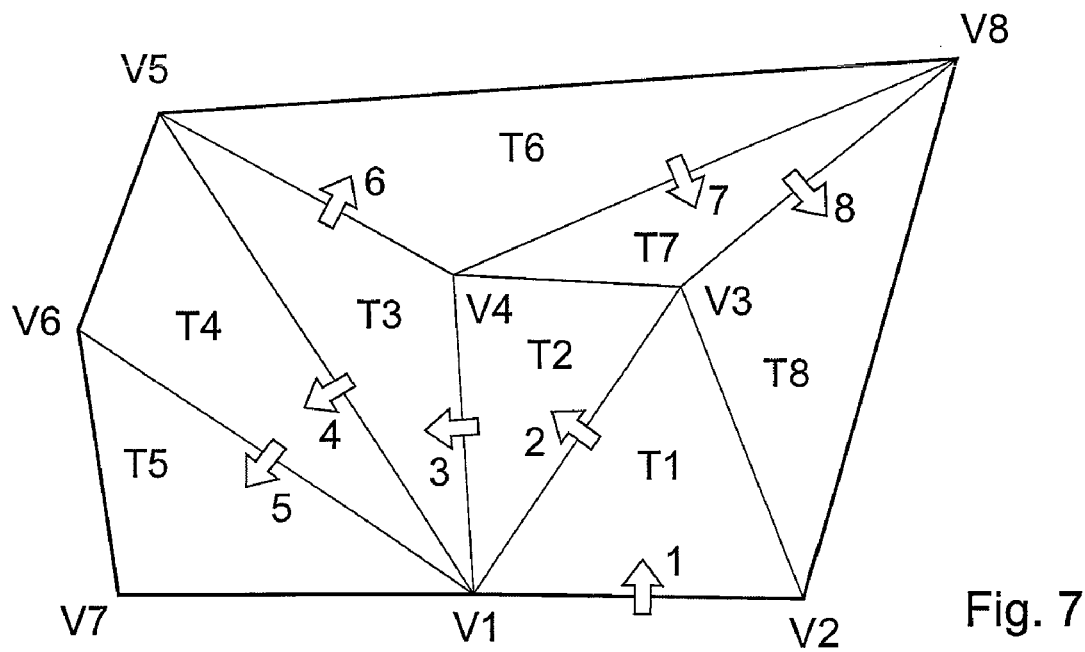
FIG. 7 illustrates a group of triangles which together represent a surface.

The arrow 61 in FIG. 6 does not form part of the representation of the triangle, but is used for illustrative purposes in FIG. 7, and is used to define an "entry" to the triangle, which passes through the first edge 54.

FIG. 7 illustrates a group of triangles which together represent a surface. The triangles are tessellated, as shown in FIG. 7, to define an approximation of the surface of an object. The relationships between the triangles are, in a conventional tessellated data structure, represented by data structure as shown in FIG. 4.

However, in an embodiment of the invention, in order to achieve compression of the object, the triangles are processed to identify stripes, that is series of adjacent triangles. In identifying stripes, the process identifies either right-handed stripes, or left-handed stripes. In the present example, it is assumed that left-handed stripes are given precedence over right-handed stripes. This is illustrated in FIG. 7. Accordingly, the arrow 1 identifies a first triangle T1, having three vertices V1, V2 and V3 (T1[V1,V2,V3]). A second triangle T2[V1,V3,V4] in the stripe is that which is located adjacent the left edge of the first triangle T1, that is as represented by the arrow 2. The next triangle T3[V1,V4,V5] in the stripe is taken to be that which is at the left-handed edge of the second triangle T2, as represented by the arrow 3. Likewise, the fourth triangle T4[V1,V5,V6] is that at the left-hand edge of the third triangle T3 as represented by the arrow 4. The fifth triangle T5[V1,V6,V7] is that represented by the triangle at the left-hand edge of the fourth triangle T4, as represented by the arrow 5. However, it will be noted that there are no further triangles adjacent the triangle T5. Accordingly, in the example to be explained later, the next triangle that would be identified is the most recently processed triangle which has a triangle at its right-hand edge, namely that is the triangle T6[V5,V4,V8] at the right-hand edge of the third triangle T3, as represented by the arrow 6. The next triangle to be processed would be the triangle T7[V8,V4,V3] at the right-hand edge of the triangle T6, the triangle T6 having no triangle at its left-hand edge. Similarly, the next triangle to be processed would be the triangle T8[V8,V3,V2] at the left-hand edge of the seventh triangle T7, as represented by the arrow 8. In this manner, a stripe can be generated moving around the set of triangles by looking first at the left-hand edges and then at the right-hand edges.

The purpose of the process as described above is to compress the representation of the triangles. The compression of the definition of the triangles can be achieved in that, with a first triangle (i.e., the triangle T1 represented by the arrow 1 in FIG. 7) having each of the three vertices V1, V2 and V3 defined, it is only necessary to define the third vertex V3 of the second triangle T2 to have a complete definition of that triangle. Similarly, each of the succeeding triangles can be defined with respect to two vertices defined for earlier triangles and the third vertex. In the case of the eighth triangle, each of the vertices has already been defined and therefore this triangle can be identified merely by reference to the other triangles.

Figure 8:
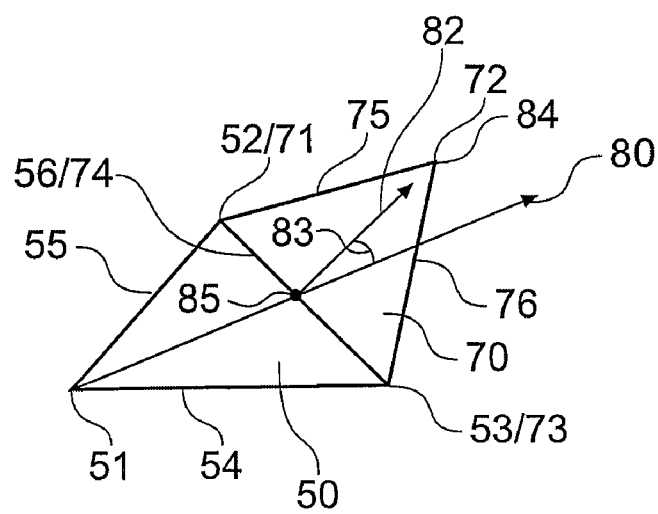
FIG. 8 is a schematic representation of an example of a compressed representation of two triangles.

FIG. 8 is a schematic representation of an example of a compressed representation of two triangles, 50 and 70. The first triangle 50 would be defined in the conventional way as illustrated in FIG. 6, with the definitions of the vertices, the edges, and the normals (it being noted that the normals are not shown in FIG. 8 to avoid unnecessary complication of the Figure).

The second triangle 70 can then be defined with respect to the first triangle 50 by reference to the common vertices, 52/71 and 53/73, and the third vertex 72. The third vertex 72 could be defined in terms of Cartesian coordinates. However, to further compress the representation of the vertex 72, in the compressed representation, it is defined in terms of a vector 82 from a point 85 midway along the edge 56/74 which is shared in common between the triangles 50 and 70, that is the edge which extends between the vertices 52/71 and 53/73. The vector 82 can be represented more compactly than the Cartesian coordinates for the point 72. This is due, in part, to the vector 82 being a short vector so that a length parameter for the vector can be defined using only a few bits. The vector 82 is defined with Cartesian coordinates in a local coordinate system. This coordinate system is determined using the triangle 50.

The number of bits chosen to represent the vector 82 can be chosen according to the desired resolution in a particular embodiment. However, the number of bits required to define the vector 82 will typically be less than would be required to define the absolute x, y and z coordinates of the vertex 72.

In order to reduce the storage needed for coordinate points within the compressed representation, the location of points in within a mesh structure can be represented in terms of differences to a preceding point in the mesh structure rather than in absolute terms. Also when a coordinate point is encountered that has been encountered before, the values for that coordinate point do not need to be stored again.

Figure 9:
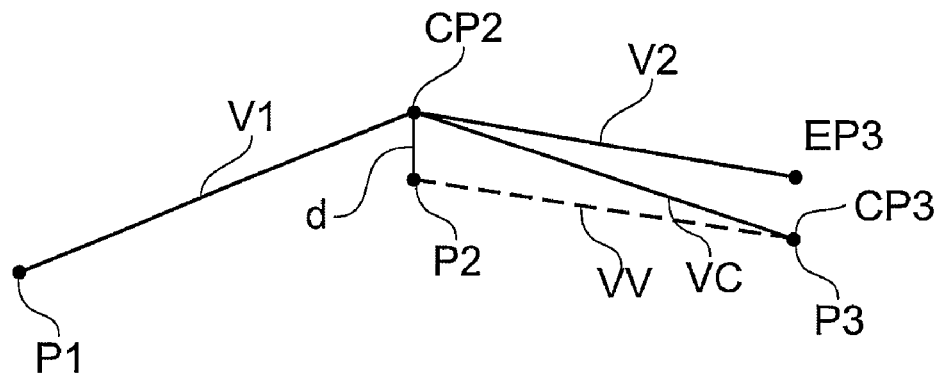
FIG. 9 illustrates the avoidance of the propagation of errors in an example of the embodiment.

FIG. 9 illustrates the avoidance of the propagation of errors in an example of the embodiment.

In the example illustrated in FIG. 9, a vector V1 forms an approximation of the vector between a first uncompressed point P1 and a second uncompressed point P2. As illustrated in FIG. 9, the vector does not align exactly with Point P2, but instead defines a compressed point CP2 that deviates from the uncompressed point by a delta error d. It should be noted that the error is exaggerated in FIG. 9 for illustrative purposes. In practice, the error between the uncompressed point and the compressed point could be very small due, for example, to rounding errors.

However, if an error occurs in the definition of the vector V1, this can propagate through the model if a new vector is then to be computed from the point P2 to the point P3. If we assume that the virtual vector VV would be calculated, if this is computed from the uncompressed point P2, even if it accurately defined the third point P3, then in the compressed representation the third point would be represented by an erroneous position EP3 and the delta error would be propagated. In fact, if a further rounding error occurred, then the representation of the third point could include yet a further delta error.

In order to avoid the propagation of errors in this manner, in an example embodiment, the compressed point CP2 is used to replace the uncompressed point P2 in a working copy of the data structure, so that in the calculation of the point P3 a vector VC can be generated that is based on the compressed point CP2 and the uncompressed point P3, so that the compressed point CP3 as represented by the compressed vector VC can correspond to the uncompressed point P3 (subject to rounding errors). In this manner, the example embodiment can avoid the propagation of errors in the computation of the compressed representation that can result, for example, as a result of rounding errors, truncation of the values, etc.

Figure 10:
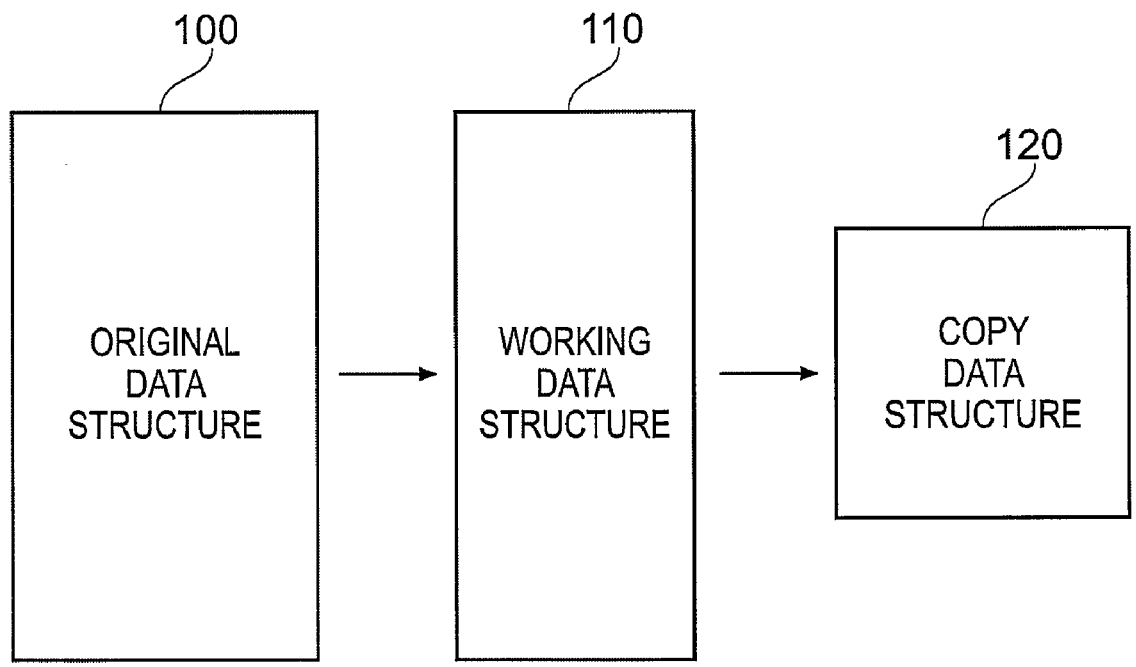
FIG. 10 is a schematic block diagram to illustrate that different versions of a data structure can be used in the generation of a compressed representation of an object.

FIG. 10 is a schematic block diagram to illustrate that different versions of a data structure can be used in the generation of a compressed representation of an object. In an example embodiment to be described in the following, an original data structure 100 to be compressed is copied to form a working uncompressed data structure 110 that can then be processed and compressed as described in the following to form a compressed data structure 120. In the example embodiment to be discussed, compressed values that are computed during sequential processing of the elements of the uncompressed working data structure are fed back to or re-injected into the working uncompressed data structure so that they can be used in the processing of further elements to avoid the propagation of errors. The original data structure, the working data structure and the compressed data structure can be held in the memory 14 of the computer system, subject to capacity. Alternatively, they can be held in the storage 26, and relevant parts of the data structures currently being processed can be brought into the memory 14.

Figure 11:
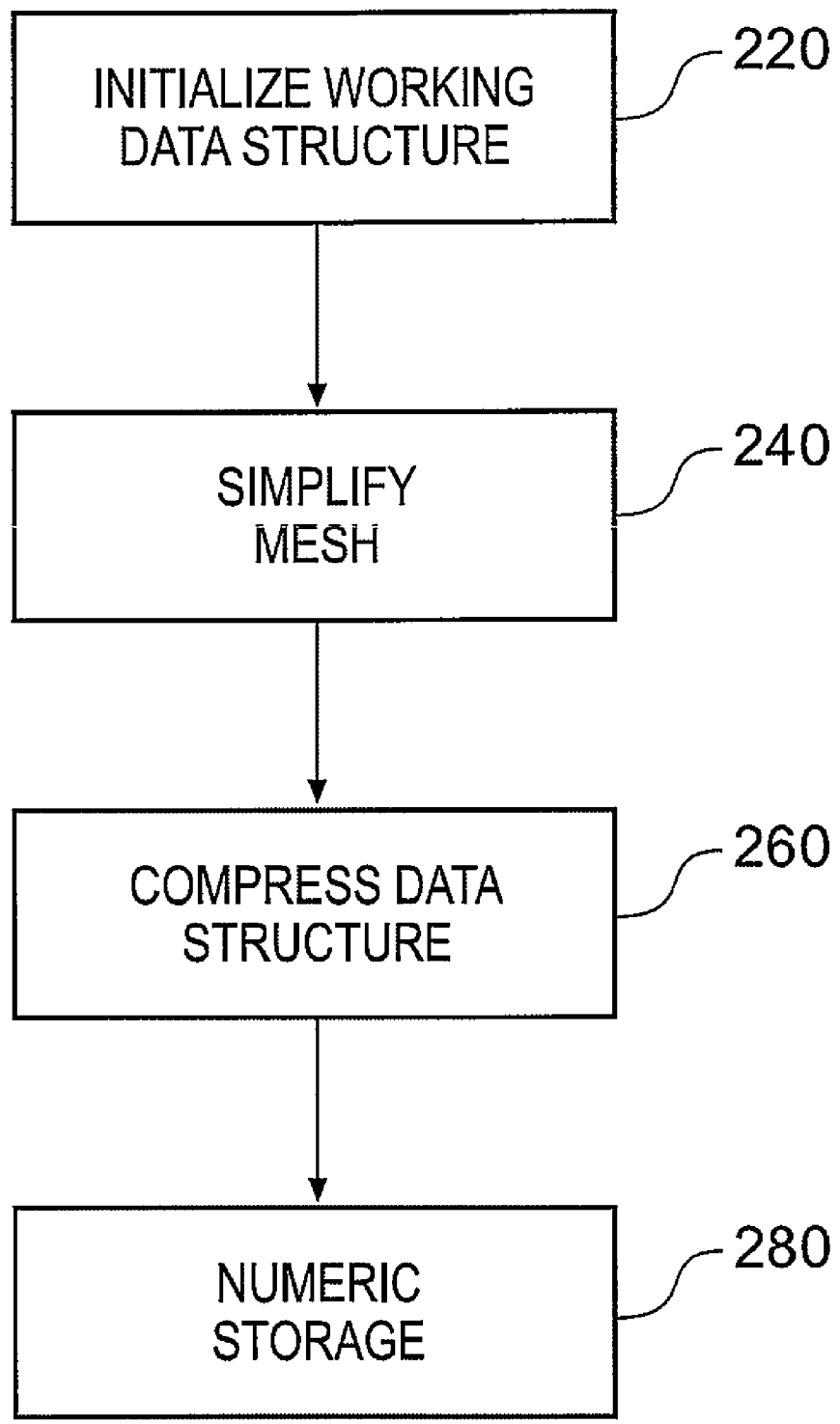
FIG. 11 is a flow diagram giving an overview of part of a method of compressing a tessellated data structure.

FIG. 11 provides an overview of an example of a process for compressing the data structure forming the digital representation of an object.

In step 220, the working data structure 110 is initialized from the original data structure 100.

In step 240, the mesh forming the relationships between the triangles is simplified, where possible, in the working data structure 110.

In step 260, the compressed data structure 120 is generated from the working data structure, with as mentioned above, the working data structure 110 being updated on the fly during processing.

In step 280, numeric storage in the compressed database 120 is performed as described below with reference to FIG. 16.

These steps will be described in more detail in the following.

Figure 12:
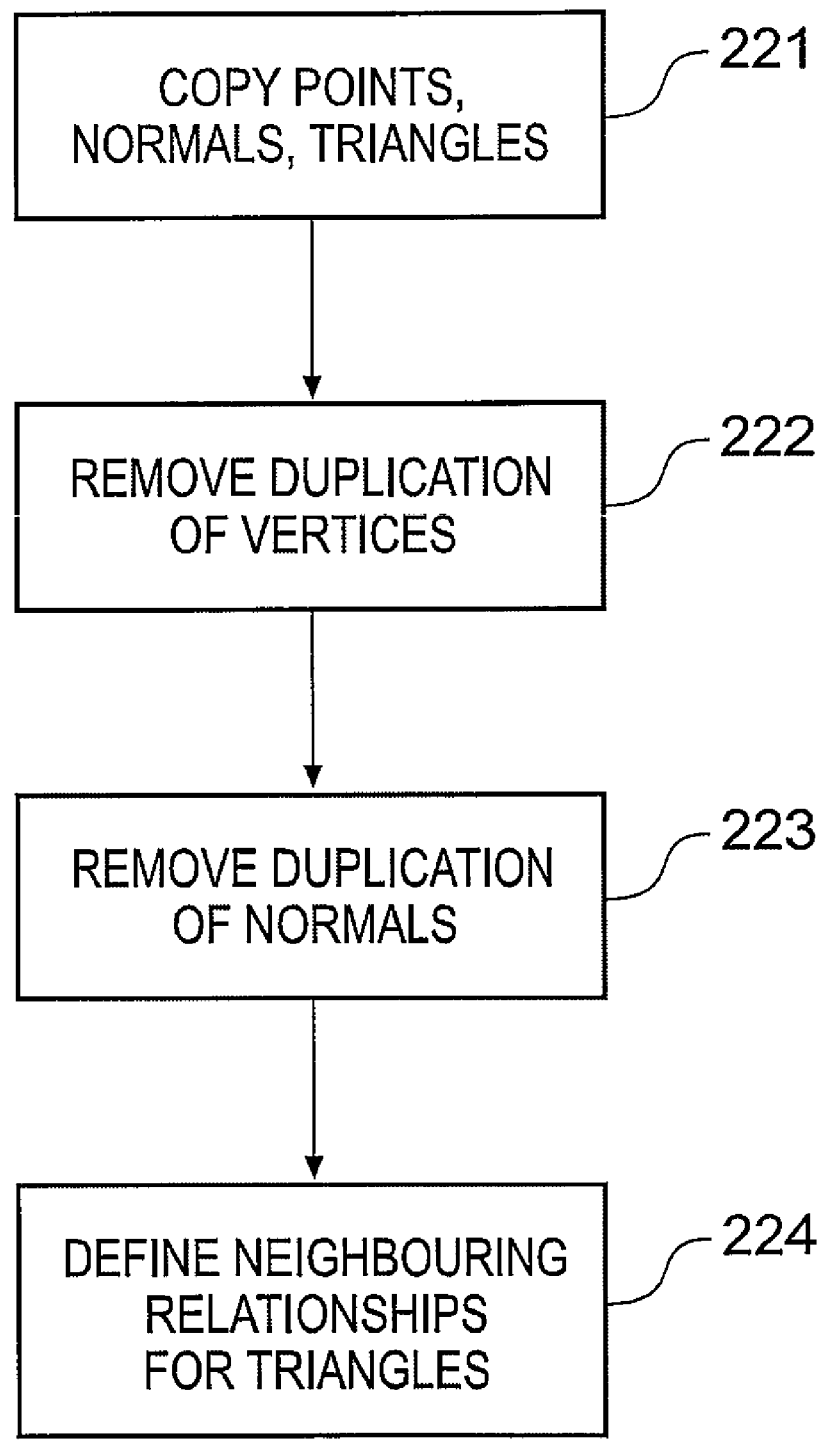
FIG. 12 is a flow diagram illustrating a part of the method of FIG. 11 in more detail.

FIG. 12 is a flow diagram explaining, in more detail, steps in the initialization of the data structure 220.

In step 221, the points, normals and triangles from an original data structure are copied to a copy of that data structure which forms a working copy of the data structure.

In step 222, the data structure is analyzed to remove duplication of vertices. In a typical representation, each triangle will be defined with respect to its edges and own vertices. However, given that the triangles are tessellated, vertices are shared. Normally, each definition of a triangle includes definitions of the vertices for that triangle. However, in step 222, the individual definitions of the vertices in the working data structure can be replaced in the working data structure by links to a common definition of that vertex.

Similarly, in step 223, the normals at the vertices can be duplicated in that each definition of the triangle will normally have a definition of the respective normals for that triangle. The individual definitions of the normals can be replaced in the working data structure by a link to a single definition of that normal.

In step 224, the relationships between the individual triangles are identified in the working data structure and stripes of triangles can be determined as discussed as defined by links between the representations of the individual definitions of the triangles in the working data structure.

Figure 13:
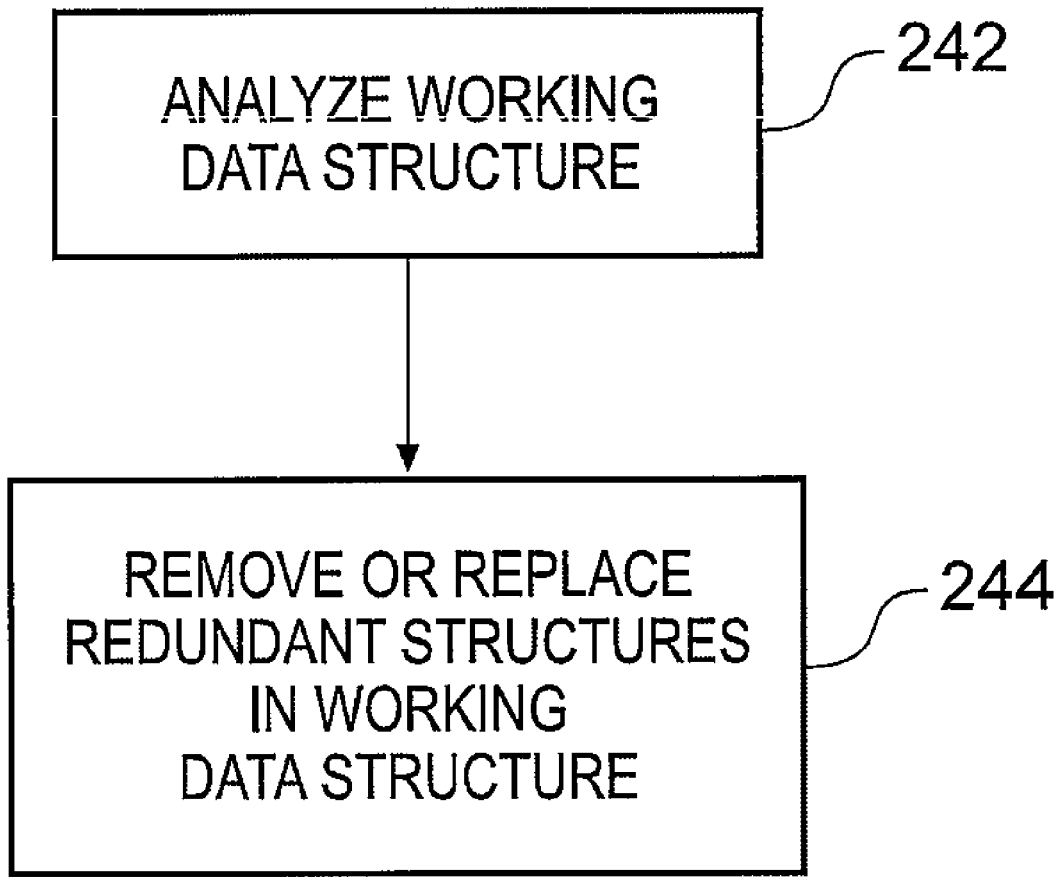
FIG. 13 is a flow diagram illustrating another part of the method of FIG. 11 in more detail.

FIG. 13 provides further explanation of step 240 of FIG. 9.

In step 242, the working data structure as modified in step 220 is further analyzed. In step 244, as a result of that analysis, if redundant structures are identified in the data structure, for example if there duplication of triangles, or triangles are identified which approximate to a single edge (i.e., they are very thin), these can be removed or replaced in the data structure to avoid the unnecessary duplication, or the inclusion of triangles that are so fine as to approximate to a straight line.

Figure 14:
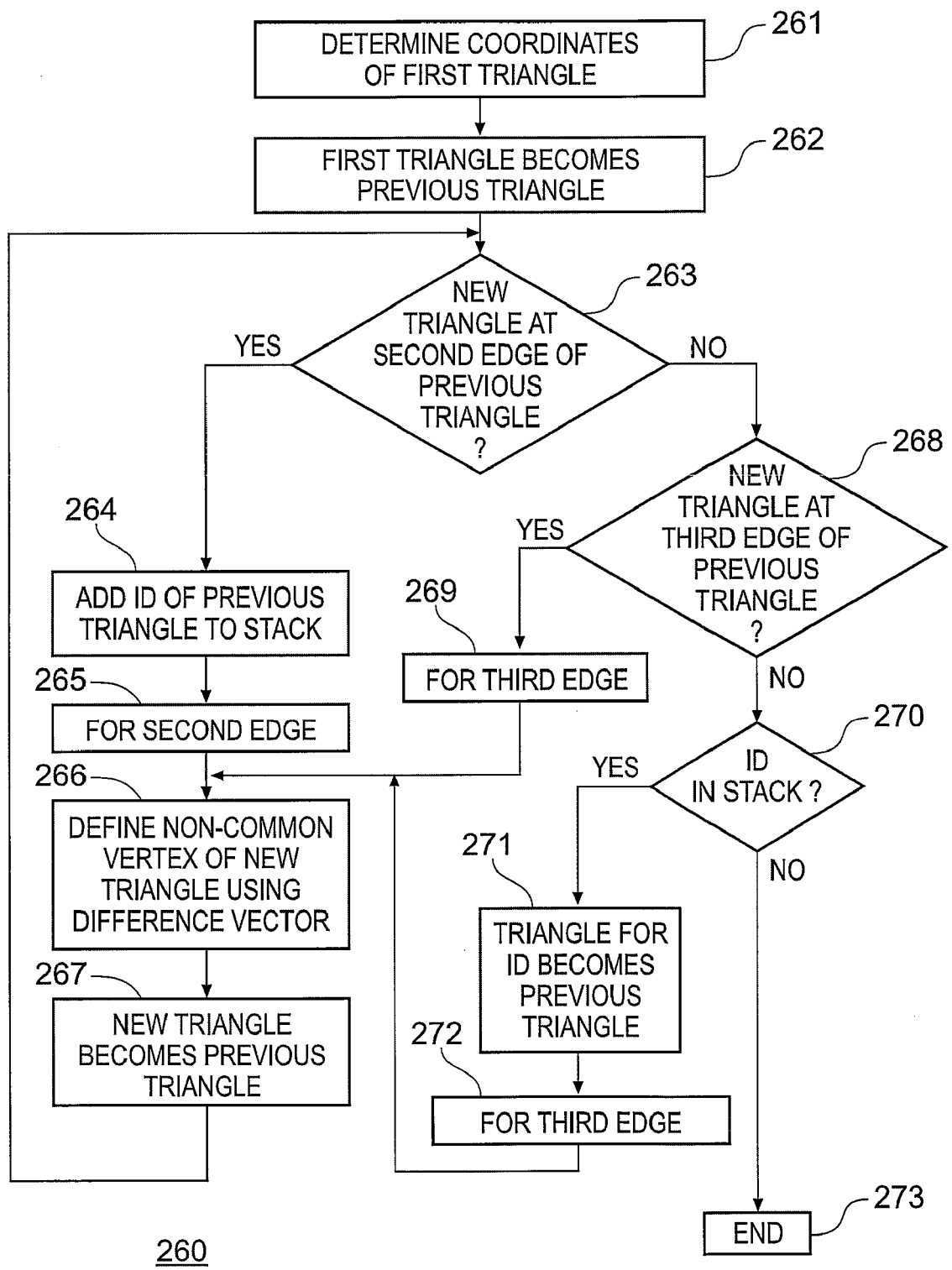
FIG. 14 is a flow diagram illustrating another part of the method of FIG. 11 in more detail.

FIG. 14 is a flow diagram representing in more detail the generation of the compressed data structure 120 from the working data structure 110 in step 260 of FIG. 11. This compression step relates to the processing of the individual triangles as discussed with reference to FIG. 8.

In step 261, a first triangle for a stripe is identified (e.g., arbitrarily) and the coordinates of that triangle are determined for the compressed data structure from the data values in the working data structure. The determination of the coordinates for the first triangle include the Cartesian coordinates for the vertices 51 and 53, and a vector defining the location of the third vertex 52 with respect to the edge of the triangle that extends between the vertices 51 and 53. As well as including the compressed representation of the triangle in the compressed data structure 120, the data values in the working data structure 110 are updated as described with reference to FIG. 9 in the working data structure.

In step 262, that first triangle becomes the previous triangle for the terms of the method as described in FIG. 260.

In step 263, a determination is made as to whether there is a further or new triangle at a second edge of the previous triangle. In the present example, a second edge of the triangle is a left-hand edge as viewed from the first edge of the triangle (although as explained earlier, in another example the second edge could be the right-hand edge). The first edge is either the edge 54 in respect of the first triangle 50, or an edge that is in common with the previous edge for subsequent triangles.

If there is a new triangle at the second edge of a previous triangle, the identity of the previous triangle is added to a stack from which it can be accessed later. During processing, each triangle for which a new triangle is found at the second edge is added to the stack so that subsequently the third edge of that triangle can be examined to see whether there is yet a further new triangle at the third edge. The stack can be defined in the memory 14 of the computer system 10 of FIG. 1, for example within the data area 38 illustrated in FIG. 2. Alternatively, it could be held, at least partially, in the storage 26 of the computer system 10.

Then, as represented in step 265, for the second edge, the steps 266 and 267 are performed.

In step 266, the compressed representation of the third vertex of the new triangle is defined using a difference vector as described with reference to FIG. 8. The definition of the third vertex is added to the compressed data structure 120. In addition, the compressed representation of the third vertex is fed back to or re-injected into the working data structure 110. By re-injecting the definition of the compressed vertex into the working data structure 110, this can then be used for determining subsequent definitions of the vertices for future triangles, and can avoid the propagation of errors as described with reference to FIG. 9. Step 266 is described in more detail with reference to FIG. 15.

In step 267, the triangle having just been processed (the new triangle) becomes the previous triangle for the processing of the next triangle in the stripe.

If at step 263, it was determined that there was no new triangle at the second edge of a previous triangle, then in step 268, it is determined whether there is a new triangle at the third edge of the previous triangle. If there is a third edge at the previous triangle, then as represented at 269 for that third edge, the steps 266 and 267 are performed.

If, at step 268, it is determined that there is no triangle at the third edge of the previous triangle, then at step 270, it is determined whether the identity (ID) of a previous triangle in held in the stack. If the ID of a previous triangle is held in the stack, then the ID of the previous triangle at the head of the stack is taken, and in step 271, the triangle corresponding to that ID becomes the previous triangle such that, as represented in step 272, for the third edge of that previous triangle the steps 266 and 267 are performed.

If, at step 270, there is no further ID in the stack, then it is determined that the last triangle in the stripe has been processed, and the process ends at step 273.

Figure 15:
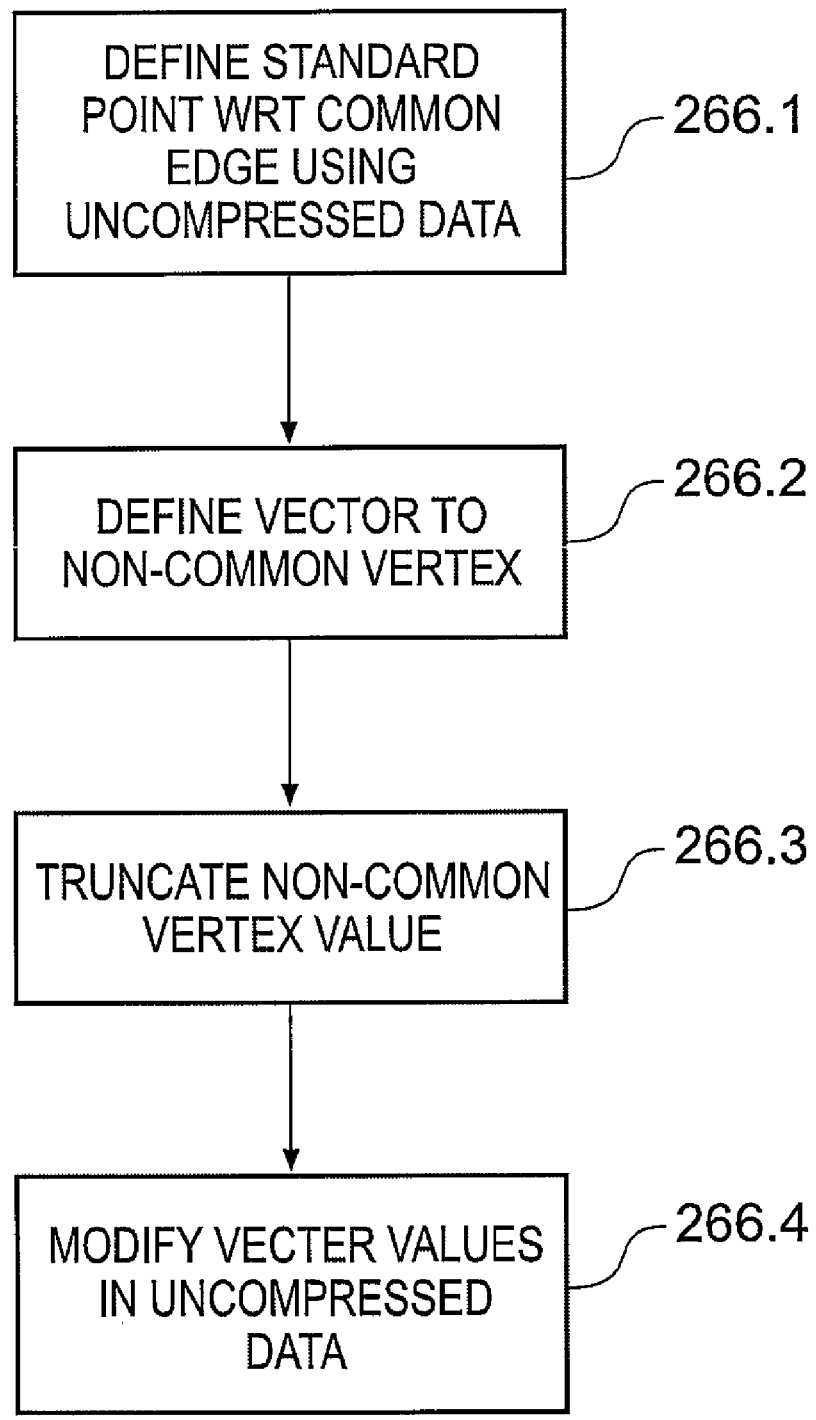
FIG. 15 is a flow diagram illustrating a part of FIG. 14 in more detail.

FIG. 15 describes an example of the processing performed in step 266 in more detail.

In step 266.1, a standard point with respect to a common edge is defined using uncompressed data. In other words, a point 85 as shown in FIG. 8 is identified using uncompressed data from the working data structure 110. In the example shown in FIG. 8, this can be determined by taking the midpoint of the edge between the vertices 52/71 and 53/73. In other examples, the standard point could be some other point with respect to the previous triangle, for example a point along the vector 80 other than at the midpoint of the edge 56/74.

In step 266.2, a vector is defined to the non-common or third vertex of the new triangle (e.g., 72 in FIG. 8). As indicated with respect to FIG. 8, this vector 32 can be defined, for example, with respect to a vector 80 that passes from the non-common vertex of the first triangle and passes through the midpoint between the common edge between the new and previous triangles.

In step 266.3, the non-common vertex value can be truncated to a desired degree of accuracy in order to provide a desired resolution for the data. The truncation results in a loss of data, but this can be to a desired amount in order to achieve a desired degree of compression. For example, if data values are normally represented by 4 bytes (32 bits) they could, for example, be truncated to one byte (8 bit) integers.

In step 266.4, the truncated vector forming the definition of the third vertex is added to the compressed data structure 120 for compressed representation of the new triangle. In addition, the compressed representation of the third vertex is fed back to or re-injected into the working data structure 110. As mentioned above, by re-injecting the definition of the compressed vertex into the working data structure 110, this can then be used for determining subsequent definitions of the vertices for future triangles, and can avoid the propagation of errors as described with reference to FIG. 9.

Figure 16:
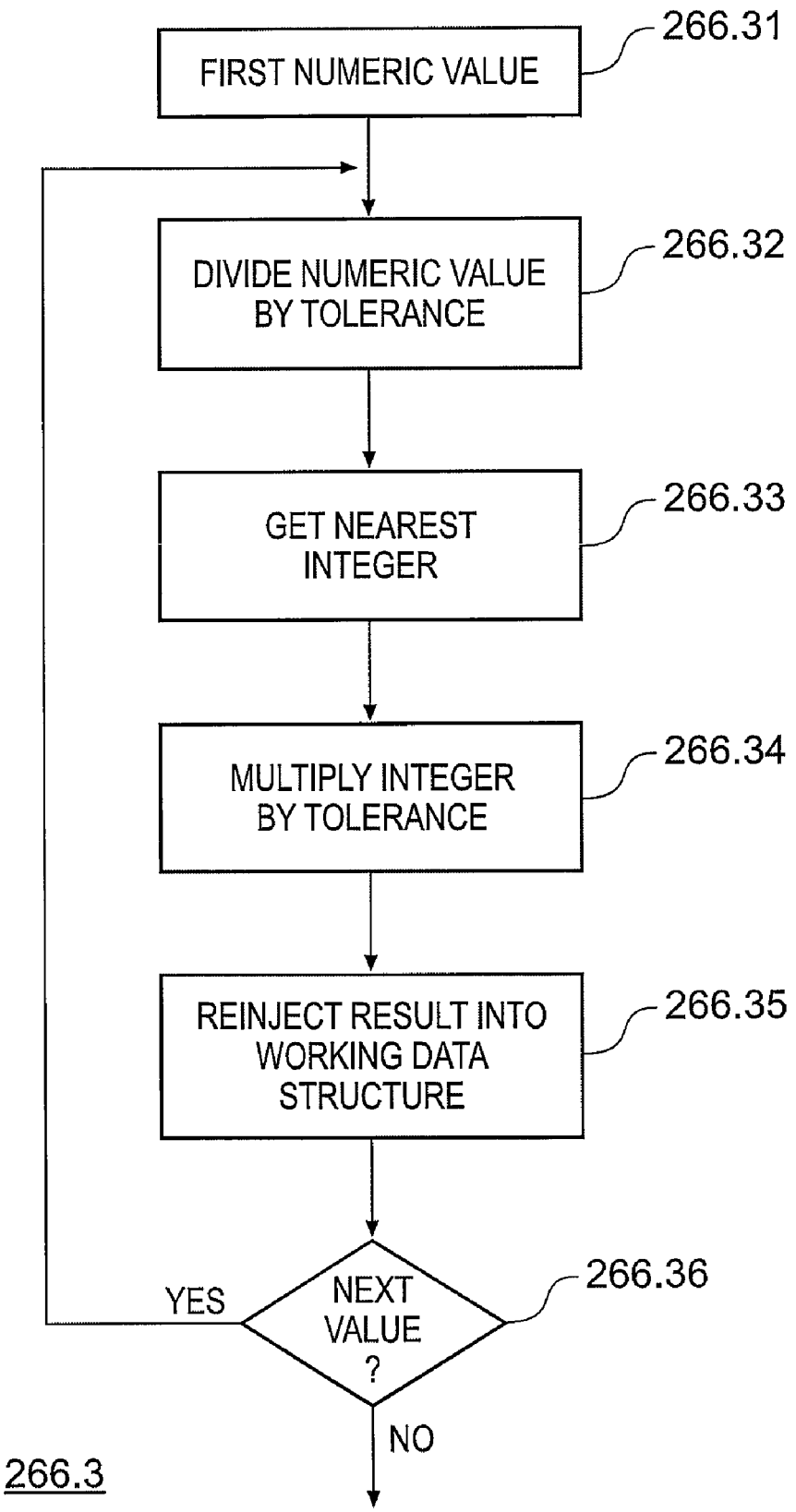
FIG. 16 is a flow diagram illustrating part of FIG. 15 in more detail.

FIG. 16 illustrates step 266.3 in more detail. This provides truncation and numerical approximation of digital values to provide lossy compression of the numerical values in a re-writeable manner.

In step 266.31, a first numeric value for the definition of the vector is processed.

In step 266.32, the numeric value is divided by a tolerance factor that defines a desired degree of approximation.

In step 266.33, the next nearest integer to the result of the division in step 266.32 is taken.

In step 266.34, the integer is multiplied by the tolerance factor.

In step 266.35, the floating point number (float) that results from the multiplication is fed back to or re-injected into the working data structure.

In step 266.36, if there is a further numeric value for the face, then this is processed at step 266.32, otherwise the numeric compression process terminates.

Figure 17:
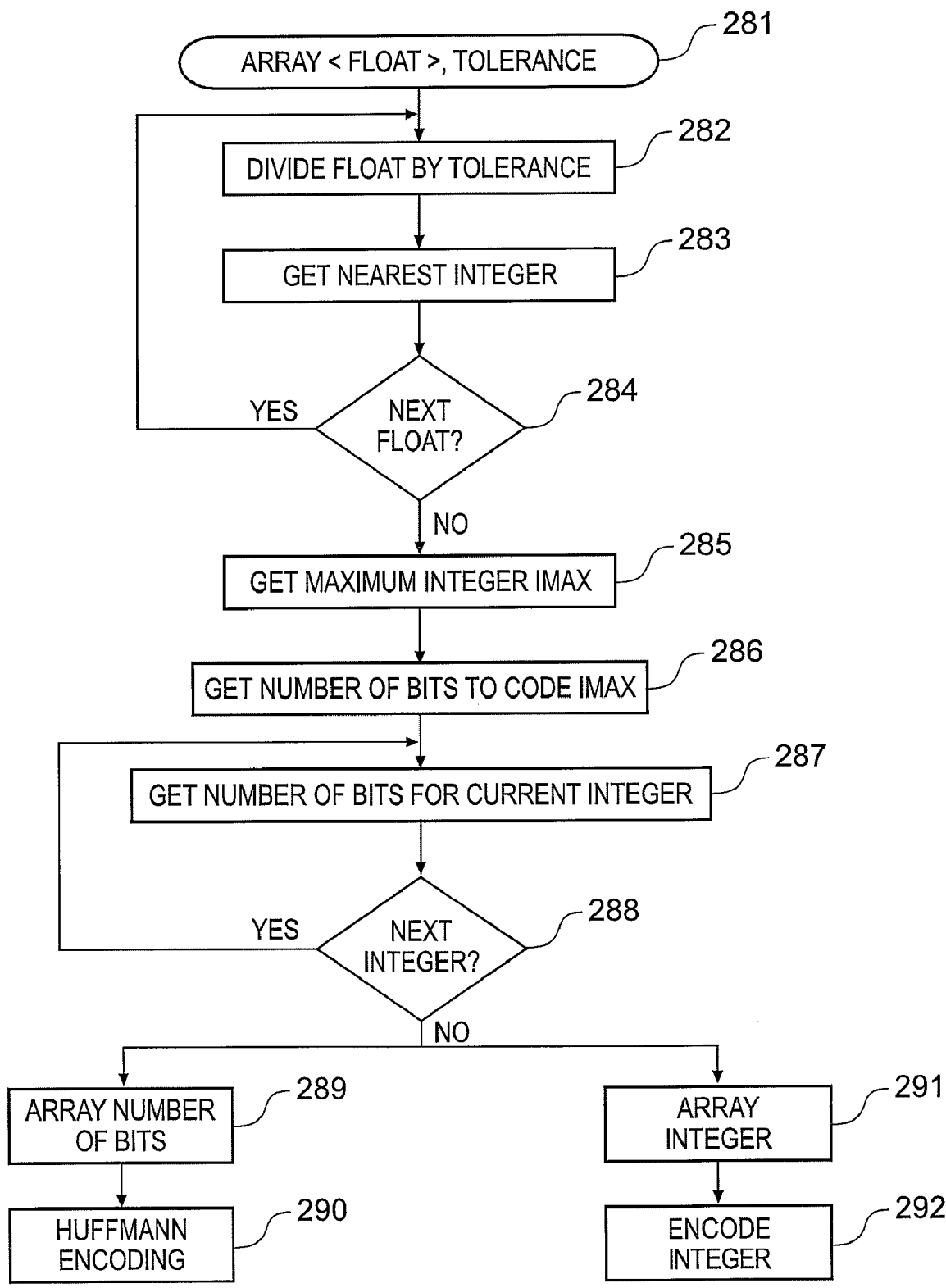
FIG. 17 is a flow diagram illustrating another part of the method of FIG. 11 in more detail.

FIG. 17 illustrates in more detail an example of the numeric storage step 280.

The numerical values are represented as an array of floating point numbers (float) and the tolerance value, as shown at 281, referred to with respect to FIG. 16. The process starts for a first floating point number.

In step 282, the floating point number is divided by the tolerance.

In step 283, the nearest integer is taken.

In step 284, if there is a further floating point number, then this is processed in step 282.

Otherwise, when all floating point numbers have been processed, then in step 285, a maximum integer value is determined (Imax).

In step 286, the number of bits to encode Imax is identified. The process then continues for the first integer.

In step 287, the number of bits for the current integer is determined.

In step 288, if there is a further integer, then this is processed at step 287 as the current integer.

Otherwise, following step 288, the process is complete with the result being a first array comprising a number of bits for each integer in step 289, and a second array containing the respective integers in step 291. In other words, the arrays have the same number of entries, with the array of step 291 having the integers and the array of step 289 having the number of bits for each of those integers.

In step 290, the array of step 289 is Huffman encoded, and in step 292 the array of integers of step 291 is encoded using the respective numbers of bits as in the first array referred to with respect to step 289.

Using numeric storage as represented in FIG. 10 can reduce the amount of storage required to represent a digital value.

With reference to the data structure illustrated in FIG. 4, points and triangles in a mesh can be represented by parameters as set out in Table 1 below:

TABLE 1

| NAME | TYPE | DESCRIPTION |
| --- | --- | --- |
| Tolerance | double | 3D points tolerance |
| point_array | int[ ] | Array of points |
| edge_status_array | char[ ] | Triangle flags for triangle neighbors |
| point_reference_array | int[ ] | Relative references (see below) |
| point_is_a_reference | bool[ ] | Indicate whether a point is a reference. |

The tolerance defines threshold or resolution for coordinate values.

The point array describes the vertex coordinates of each point. Coordinates are stored for a point during the creation of the compressed data structure only when a point has not been encountered before. Otherwise, a reference to point already stored is used (see the point_reference_array as described below).

As described earlier, a first triangle of a mesh, say triangle T1, can be chosen, for example randomly. The triangle T1 has vertices V1, V2 and V3, and its first vertex and edge (e.g. V1 and [V1,V2], respectively) can also be chosen, e.g., randomly. This first triangle can be stored in the copy data structure 120 in the following way.

The coordinates X,Y,Z of V1 can be divided by the tolerance (threshold or resolution) and the nearest 3 integers can be stored as V1app (where app is short for approximation). The value for V1 can then be updated in the working data structure 110.

For the next vertex, V2, difference values (DV2=V2−V1) for the coordinates can be computed and the resulting values compressed using the tolerance and stored as DV1app values in the copy data storage 120. The values for V2 can then be updated in the working data structure 110.

For the third vertex, V3, difference values (DV3=V3−(V1+V2)/2 can be computed and the resulting values compressed using the tolerance and stored as DV3app values in the copy data storage 120. The values for V3 can then be updated in the working data structure 110.

For subsequent triangles, they will always be entered through an edge as explained earlier. If it is assumed that the vertices of the current triangle to treat Ti are Va, Vc and Vd, and [Va,Vc] is the edge that is entered, Ti−1 [Va,Vb,Vc] being the previously treated triangle which is the neighbor of the current triangle at the edge [Va,Vc]. If Vd is not a reference as already stored in a point_is_a_reference array (see Table 1 below), the coordinates for Vd can be computed and stored as described below.

A coordinate system is defined using Tn. Firstly, an origin O can be defined as follows:

Origin $O=(Va+Vc)*0.5$.

Axes for the coordinate system can be defined as follows:

$$\vec{X}/\|\vec{X}\| = (\vec{Vc}-\vec{Va})/\|\vec{Vc}-\vec{Va}\| \quad (1)$$

$$\vec{Z_{temp}} = \vec{Vd}-\vec{O} \quad (2)$$

and $$\vec{Z} = \vec{Z_{temp}} \wedge \vec{X}/\|\vec{X}\| \quad (2)$$

$$\vec{Y}/\|\vec{Y}\| = \vec{Z}/\|\vec{Z}\| \wedge \vec{X}/\|\vec{X}\| \quad (3)$$

In equation (1), V1 and V2 are taken so that V1 has a treatment index less than V2 (which means that V1 has been treated before V2).

The edge status array describes the relationships between triangles. Each triangle has a flag that is initialized to zero and then is set to a first value if the triangle has a right neighbor and is set to a second value if the triangle has a left neighbor.

The point reference array is used to store treatment indexes of points that have been stored by processing a previous triangle.

The point_is_a_reference is used to indicate if a point has already been treated.

Further, normals in a mesh can be represented by parameters as set out in Table 2 below:

TABLE 2

| NAME | TYPE | DESCRIPTION |
| --- | --- | --- |
| normal_binary_data | bool[ ] | Information to compute normal |
| normal_angle_array | short[ ] | Spherical coordinates |
| is_face_planar | bool[ ] | is the corresponding face planar? |

The normal_binary_data field is a bit field used to store information types on normals. A "has_multiple_normal" bit is true if the current vertex has many normals. This bit is added only if the current vertex is encountered for the first time. A "triangle_normal_reversed" is true if a computed triangle normal used to define a local coordinate system must be reversed. An "is_a_reference" is true if the current normal is stored as a reference on another normal of the current vertex. In this case, reference_index denotes the value of the reference. It is stored in normal_binary_data on a variable number of bit: number_of_bits. A "number_of_bits" value is computed using number_of_stored_normals:number of already actually stored normals (without references) on the current vertex. An "x_is_reversed" bit is true if the x-coordinate of the normal in the local coordinate system is reversed (true if x is reversed). The same applies for y_is_reversed.

The "normal_angle_array" describes spherical coordinates of normals (normals are unit vectors). Values stored are comprised between 0 and PI/2. For each triangle, a local coordinate system is computed and used to calculate these two angles. Finally, these two angles are compressed and temporarily stored as a short value (short). The compressed value is computed using normal_angle_number_of_bits. This number must be less than 16, (default value is 10) to be stored in an array of shorts.

An "is_face_planar" bit is true if the corresponding face is planar. In this case, only one normal is stored for all triangles of this face. It is stored when treating the first vertex of the first triangle of this face.

Accordingly, there has been described a computer-implemented method, an apparatus and computer program product for compressing a digital representation having a data structure with tessellated data defining an object in terms of triangles. The digital representation is compressed by analyzing the tessellated data to identify neighboring triangles, identifying stripes comprising series of neighboring triangles, redefining a given triangle with respect to a preceding triangle in the stripe in terms of a vertex of the given triangle that is not on a common edge with the preceding triangle. The third vertex is defined in terms of a vector from a predetermined position with respect to the common edge.

An embodiment of the invention described above can enable the storage of a mesh structure formed of triangles in a highly compressed representation in terms of triangles and corresponding points, triangle normals, textures and attributes. Triangles can optionally belong to geometrical faces, for grouping the triangles.

The starting point for the describe process can be a mesh structure forming the original data structure 100 of FIG. 10. The mesh can be described with points, normals and triangles and has an implicit topology. Each triangle can have 3 normals (one for each point). The triangle normal can be determined by cross-product on its vertices, oriented in conjunction with one of its 3 normals. A tolerance, which forms a threshold or resolution, for approximation can be given as an input value. The triangles have edges, lengths and heights greater than the tolerance.

The input non-compressed mesh can be duplicated into a working data structure 110. The working data structure is then traversed as described above. At each step in the traversal, an approximation on points, normals and textures can be made and the results of these approximations can be re-injected into the working structure and can be used in further calculations until traversal is completed and the compressed mesh is output as the copy data structure 120.

There has also been described a data structure forming a product of the aforementioned method for modeling a solid forming at least a part of an object. The compressed data structure can used tessellated triangles and at least one coordinate of a vertex of a triangle can be defined in terms of a difference value with respect to at least one other vertex.

A computer program product for implementing the invention can be in the form of a computer program on a carrier medium in the form of a computer readable medium. The data structure can also be provided on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A computer-implemented method, comprising:
obtaining a digital representation of an object, the digital representation comprising a data structure with tessellated data defining the object in terms of triangles representing faces on a surface of the object and digital values representing the coordinates of the vertices of the triangles and vectors representing normals to the surface;
analyzing the tessellated data to identify neighboring triangles, that is triangles that have a common edge;
identifying one or more stripes each comprising a series of neighboring triangles;
for each stripe, compressing the series of neighboring triangles in the stripe to generate compressed digital representations of the triangles in the stripe, wherein said compressing comprises, for each subsequent triangle in the stripe after an initial triangle in the stripe, defining the vertices of the compressed digital representation of the given triangle with respect to the compressed digital representation of the preceding neighboring triangle in the stripe, wherein said defining defines the vertices of the compressed digital representation of the given triangle in terms of a compressed digital representation of a third vertex of the given triangle and references to the compressed digital representations of the vertices at respective ends of the common edge for the given triangle and the preceding neighboring triangle, wherein the compressed digital representation of the third vertex of the given triangle is defined in terms of a vector from a predetermined position with respect to the common edge to the third vertex, wherein the predetermined position is a point on another vector originating at a vertex of the preceding neighboring triangle that is not common to the given triangle and that passes through a point on the common edge; and storing the compressed digital representations of the triangles to generate a compressed digital representation of the object.

2. The method of claim 1, wherein said compressing further comprises truncating digital values of the compressed digital representations of the triangles, wherein truncation comprises reducing a number of bits of the digital values.

3. The method of claim 2, wherein results of said truncation for a given triangle are used as truncated digital values for the compressed digital representation of a subsequently compressed triangle.

4. The method of claim 1, wherein the vector originating at the vertex of the preceding neighboring triangle that is not common to the given triangle passes through a midpoint of the common edge.

5. The method of claim 1, wherein the predetermined position is the point where the vector originating at the vertex of the preceding neighboring triangle that is not common to the given triangle intersects the common edge.

6. A system, comprising:
a processor; and
storage operable to store program instructions and a digital representation of an object, the digital representation comprising a data structure with tessellated data defining the object in terms of triangles representing faces on a surface of the object and digital values representing the coordinates of vertices of the triangles and vectors representing normals to the surface, wherein the program instructions are executable by the processor to:
analyze the tessellated data to identify neighboring triangles, that is triangles that have a common edge; and
identify one or more stripes each comprising a series of neighboring triangles;
for each stripe, compress the series of neighboring triangles in the stripe to generate compressed digital representations of the triangles in the stripe; and
store the compressed digital representations of the triangles to generate a compressed digital representation of the object;
wherein, to compress the series of neighboring triangles in a given stripe, the program instructions are executable by the processor to, for each subsequent triangle in the stripe after an initial triangle in the stripe, define the vertices of the compressed digital representation of the given triangle with respect to the compressed digital representation of the preceding neighboring triangle in the stripe, wherein said defining defines the vertices of the compressed digital representation of the given triangle in terms of a compressed digital representation of a third vertex of the given triangle and references to the compressed digital representations of the vertices at respective ends of the common edge for the given triangle and the preceding neighboring triangle, wherein the compressed digital representation of the third vertex of the given triangle is defined in terms of a vector from a predetermined position with respect to the common edge to the third vertex, wherein the predetermined position is a point on another vector originating at a vertex of the preceding neighboring triangle that is not common to the given triangle and that passes through a point on the common edge.

7. The system of claim 6, wherein, to compress the series of neighboring triangles in a given stripe, the program instructions are further executable by the processor to truncate digital values of the compressed digital representations of the triangles, wherein truncation comprises reducing a number of bits of the digital values.

8. The system of claim 7, wherein results of said truncation for a given triangle are used as truncated digital values for the compressed digital representation of a subsequently compressed triangle.

9. The system of claim 6, wherein the vector originating at the vertex of the preceding neighboring triangle that is not common to the given triangle passes through a midpoint of the common edge.

10. The system of claim 6, wherein the predetermined position is the point where the vector originating at the vertex of the preceding neighboring triangle that is not common to the given triangle intersects the common edge.

11. A computer program product comprising a non-transitory computer readable storage medium, the non-transitory computer readable storage medium storing program instructions, wherein the program instructions are computer-executable to implement:
obtaining a digital representation of an object, the digital representation comprising a data structure with tessellated data defining the object in terms of triangles representing faces on a surface of the object and digital values representing the coordinates of the vertices of the triangles and vectors representing normals to the surface;
analyzing the tessellated data to identify neighboring triangles, that is triangles that have a common edge; and
identifying one or more stripes each comprising a series of neighboring triangles;
for each stripe, compressing the series of neighboring triangles in the stripe to generate compressed digital representations of the triangles in the stripe; and
storing the compressed digital representations of the triangles to generate a compressed digital representation of the object;
wherein, in said compressing the series of neighboring triangles in a given stripe, the program instructions are computer-executable to implement, for each subsequent triangle in the stripe after an initial triangle in the stripe, defining the vertices of the compressed digital representation of the given triangle with respect to the compressed digital representation of the preceding neighboring triangle in the stripe, wherein said defining defines the vertices of the compressed digital representation of the given triangle in terms of a compressed digital representation of a third vertex of the given triangle and references to the compressed digital representations of the vertices at respective ends of the common edge for the given triangle and the preceding neighboring triangle, wherein the compressed digital representation of the third vertex of the given triangle is defined in terms of a vector from a predetermined position with respect to the common edge to the third vertex, wherein the predetermined position is a point on another vector originating at a vertex of the preceding neighboring triangle that is not common to the given triangle and that passes through a point on the common edge.

12. The computer program product of claim 11, wherein, in said compressing the series of neighboring triangles in a given stripe, the program instructions are further computer-executable to implement truncating the digital values of the compressed digital representations of the triangles, wherein truncation comprises reducing a number of bits of the digital values.

13. The computer program product of claim 12, wherein results of said truncation for a given triangle are used as truncated digital values for the compressed digital representation of a subsequently compressed triangle.

14. The computer program product of claim 11, wherein the vector originating at the vertex of the preceding neighboring triangle that is not common to the given triangle passes through a midpoint of the common edge.

15. The computer program product of claim 11, wherein the compressed digital representation of the object comprises:

one or more face fields, wherein each face field specifies a face of the object and references one or more triangle fields;

wherein each triangle field specifies a triangle forming at least part of a respective face and references three vertex fields, wherein the three vertex fields specify vertices of the respective triangle;

wherein, for each triangle field, each of the three vertex fields specifies a vertex of a respective triangle and references three coordinate fields, wherein each of the three coordinate fields stores a coordinate value for one of three coordinates of the respective vertex; and wherein the three coordinate values of at least one of the three vertex fields are determined by subtracting spatial coordinate values of at least one other vertex of the respective triangle from corresponding spatial coordinate values of the vertex corresponding to the vertex field.

* * * * *